INVENTORS
HAILE S. CLAY
CHARLES W. CANTONI
DONALD B. RICKETTS

BY John F. Lawler
ATTORNEY

INVENTORS
HAILE S. CLAY
CHARLES W. CANTONI
DONALD B. RICKETTS

BY John F Lawler
ATTORNEY

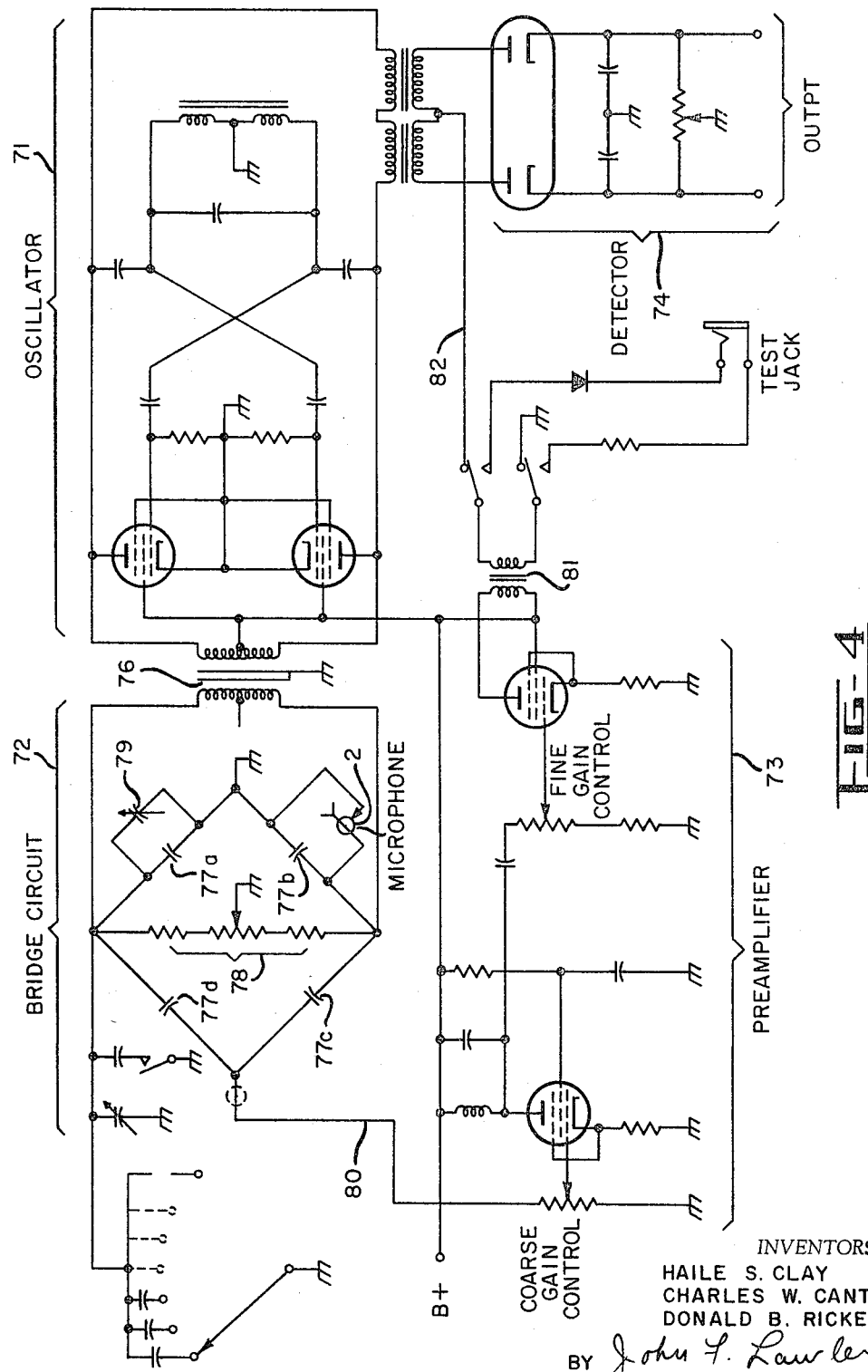

United States Patent Office 3,281,543
Patented Oct. 25, 1966

3,281,543
CALIBRATOR FOR MICROPHONES
Haile S. Clay, Palo Alto, Charles W. Cantoni, Mountain View, and Donald B. Ricketts, Sunnyvale, Calif., assignors to Sylvania Electric Products Inc., a corporation of Delaware
Filed June 26, 1963, Ser. No. 290,703
5 Claims. (Cl. 179—175.1)

This invention relates to a calibrator for microphones and more particularly to a differential bellowsphone calibrator for determining the frequency response and phase shift characteristics of a microphone.

Geologists, seismologists, and petroleum and research engineers use acoustical data acquisition systems for determining the composition and movement of the earth and for studying atmospheric disturbances. An important component of such a system is the electroacoustical transducer or microphone which converts acoustical energy into electrical energy. The frequency response and phase shift characteristics of this microphone, particularly in systems employing several microphones, must be known in order to permit accurate interpretation of compiled data. The term "sensitivity" as used herein, means the relative amplitude of the microphone as a function of an input pressure signal at a given frequency. "Frequency response" is the relative amplitude of the output of the microphone as a function of the frequency of an input pressure signal. "Phase shift" is the difference between the phase angles of the microphone output and a reference signal determined at any given frequency.

Calibration of these microphones requires a test device which generates an acoustical or sub-acoustical signal; i.e., a pressure variation having a known amplitude. As field studies involving this equipment are often conducted in remote areas, compactness and portability of the test device are highly desirable. Presently available calibrators, such as pistonphone and bellowsphone pressure signal generators, are bulky and are not accurate at sub-acoustical frequencies and so have limited utility for these applications. An example of a pistonphone calibrator is described in Acoustical Engineering by Dr. H. F. Olson (D. Van Nostrand Co., Inc., 1957) at page 424.

In accordance with this invention, apparatus is provided for determining both the frequency response and phase shift characteristics of microphones. Two bellows having different cross-sectional areas communicate with and are movable relative to a closed air-tight vessel for changing the pressure in the vessel in proportion to changes in the volumes of the bellows. The volume changes are proportional to the product of the displacement and the differential cross-sectional area of the bellows. The amplitude of pressure alternations is proportional to the ratio of the change in volume of the bellows to the volume of the vessel, and since very small differential volume changes of the bellows can be achieved readily, pressure waves of small amplitude are accurately produced with a relatively small vessel.

The microphone to be calibrated is responsive to pressure changes in the vessel. Both bellows are moved simultaneously and equally by an actuator rod to which each is fixedly secured. An electromechanical transducer, operated by rod movement, produces a reference signal for determining the phase shift characteristics of the microphone. The reference signal is produced by the reciprocating movement of the rod through a stroke of predetermined length and at a predetermined rate which in turn produces in the vessel pressure alternations of predetermined amplitude and frequency. The output of the microphone is compared to the reference signal and to a reference level to determine the phase and frequency response of the microphone.

An object of this invention is the provision of an accurate, compact, portable calibrator for determining the frequency response and phase shift characteristics of a low pressure microphone.

This and other objects and the operation of this invention will be more fully understood from the following description of a system employing this invention, reference being had to the accompanying drawings in which:

FIGURE 4 is a circuit drawing of the bridge-detector network used in the calibration system;

Figure 1:
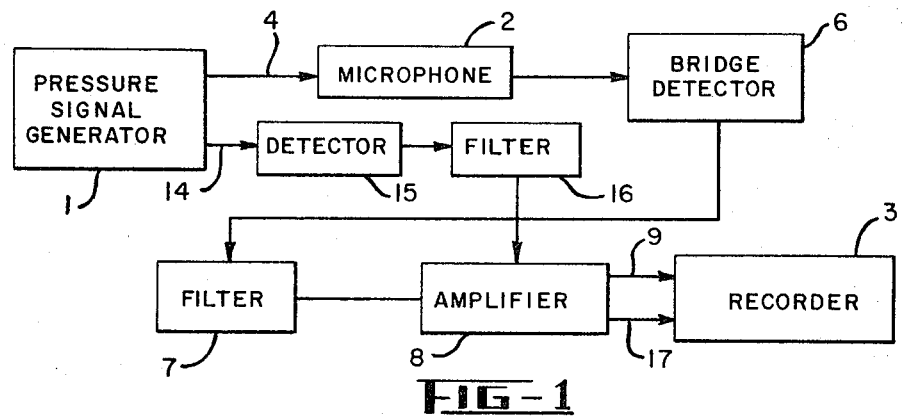
FIGURE 1 is a block diagram of a microphone calibration system embodying the invention.
Figure 5:
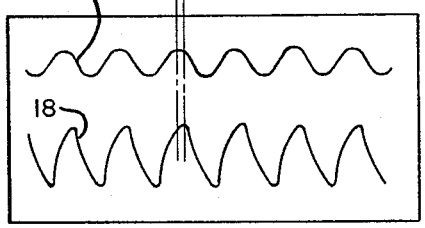
FIGURE 5 shows oscillograms depicting the reference and microphone signals.

Referring to FIGURE 1, a calibration system embodying the invention comprises a pressure signal generator or calibrator 1, microphone 2 and a recorder 3. Pressure alternations produced in generator 1 are transmitted by pressure line 4 to the test microphone 2 which is electrically connected as an element of a bridge-detector 6. The pressure alternations are converted by the microphone to an electrical analog, and the bridge-detector generates an electrical signal proportional thereto. This signal passes through filter 7 and an amplifier 8 and is applied by line 9 to recorder 3 which preferably makes a waveform display as shown at 10 in FIGURE 5. The second output from the pressure signal generator 1 is a reference signal and is applied by line 14 to a detector 15 and successively to a filter 16, amplifier 8, and to recorder 3 via line 17 where it is converted to waveform display such as shown at 18 in FIGURE 5.

Figure 2:
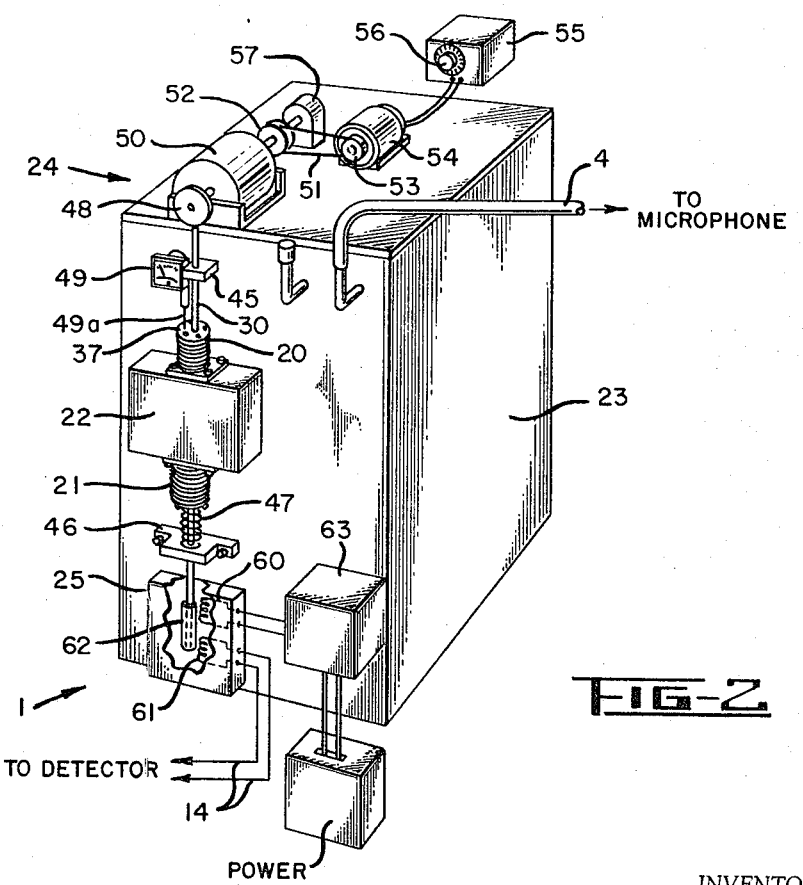
FIGURE 2 is a perspective view of the differential bellowsphone calibrator.

Calibrator 1, shown in detail in FIGURE 2, comprises a pair of cylindrical bellows 20 and 21 having different cross-sectional areas, each being secured at one end to an extension 22 of an air-tight tank 23. An eccentric cam drive means 24 is mounted on the tank and causes reciprocating movement of the bellows so as to produce variations in pressure within tank 23. A transducer 25, also mounted on the tank, is arranged to convert the motion of the bellows to a reference voltage.

Figure 3:
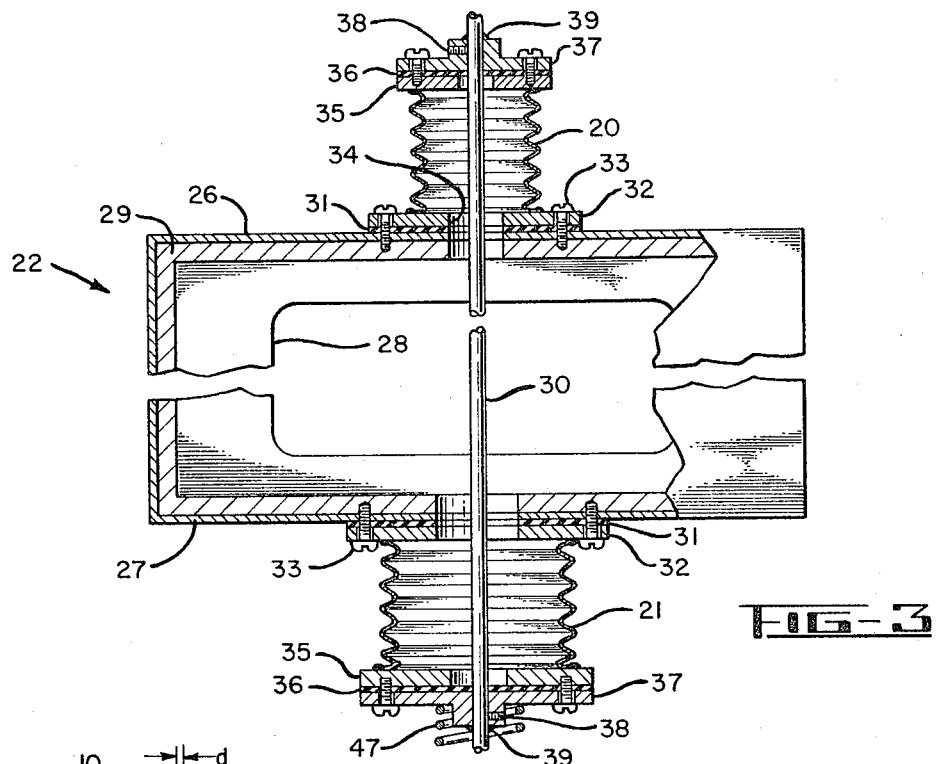
FIGURE 3 is an enlarged elevation of the bellows and vessel extension, partially broken away, showing the connection and internal construction of the extension and bellows.

Extension 22 is an air-tight box-like enclosure having a top wall 26, see FIGURE 3, and a bottom wall 27 and which communicates with the interior of tank 23 through opening 28 in the side of the tank. The interior of the pressure tank 23 and extenion 22 are preferably lined with insulating material 29 to reduce the thermal conductivity of the tank walls and thereby produce more nearly adiabatic pressure alternations.

Bellows 20 and 21 are actuated by a vertical rod 30 which extends through both bellows and the tank extension 22. Both bellows 20 and 21 are substantially identical in construction, except for diameter, and are connected to the rod 3 and to extension 22 in the same manner. Therefore, a description of one of the bellows, upper bellows 20, will be sufficient for an understanding of the construction—like reference characters indicating like parts of the bellows in the drawings.

Upper bellows 20 preferably is made of berylium copper and is secured and sealed to top wall 26 by a gasket 31 and flange 32 and screws 33. An opening 34 in top wall 26 connects the interior of bellows 20 and extension 22. The opposite end of bellows 20 is connected and sealed by flange 35 and gasket 36 to a clamp plate 37 which is secured to rod 30 by set screw 38. Plate 37 is sealed to rod 30 as by brazing at 39.

Bellows 20 has a smaller diameter than bellows 21 and so there is a difference in the change in volume of both bellows per unit of movement of rod 30. Both bellows are axially aligned with each other and when rod 30 moves in one direction, up for example, the change of volume in bellows 21 is greater than in bellows 20, resulting in an increase in pressure in tank 23. The smaller the difference in diameters of the bellows, the smaller will be the amplitude of the pressure variation in the tank per unit of movement of rod 30. The ends of the bellows 20 and 21 which are connected to actuator rod 30 move with the rod but not relative to it, thus reducing wear. Rod 30 moves freely in and is supported by bushings 45 and 46 which are secured to the tank. A compression spring 47 between bushing 46 and clamp plate 37 on the lower bellows 21 urges rod 30 upwardly.

Rod 30 is reciprocated axially by an eccentric cam 48. A displacement indicator 49, secured to bushing 45, has a probe 49a which contacts the flange 36 attached to bellows 20 for measuring axial displacement of the bellows. Eccentric cam 48 is rotated by a speed change mechanism 50, such as a gear box, connected by a drive belt 51 and pulleys 52 and 53 to a drive motor 54, which is energized by a power source 55. Drive motor 54 is preferably a D.C. shunt-wound separately excited motor to provide good speed control and regulation under varying load conditions. A potentiometer 56 of power source 55 provides control of the speed of motor 54 and thus the rate at which the actuator rod and bellows are reciprocated. Additional speed control is afforded by mechanism 50 and by pulleys 52 and 53. A tachometer 57, connected to the drive shaft of mechanism 50, measures the angular velocity of eccentric cam 48 and thus the rate of frequency of reciprocation of bellows 20 and 21.

Transducer 25 is supported on tank 23 and preferably is a linearly variable differential transformer having a primary winding 60, a secondary winding 61 and a core 62 adjacent to the windings. The coupling between primary and secondary windings varies with a change of position of core 62. Core 62 is connected to the lower end of rod 30. Primary winding 60 is energized by an oscillator 63 with an output at a suitable frequency such as 400 cycles. Secondary winding 61 is connected by lines 14 to recorder 3. When rod 30 reciprocates, the displacement of core 62 relative to the windings varies the mutual coupling between the primary and secondary windings and modulates the 400-cycle signal. This signal is demodulated by detector 15, see FIGURE 1, and is filtered, amplified and recorded to provide an oscillogram 18, shown in FIGURE 5, which is a graphic duplication of the movement of rod 30.

Bridge-detector 6 comprises an oscillator 71, see FIGURE 4, a bridge circuit 72, a preamplifier 73 and a detector 74. The output of oscillator 71 is a sinusoidal carrier signal coupled through transformer 76 to bridge 72. The bridge preferably has a capacitive element 77 in each arm and a resistive load 78. A variable capacitor 79 is connected in shunt with capacitor 77a. The microphone 2 being calibrated is connected in shunt with capacitor 77b. The microphone preferably is a condensor type electroacoustical transducer comprising a rigid and a flexible membrane or capacitor plate in an air-tight enclosure. A variation of the capacitance of microphone 2, in response to an applied pressure signal from calibrator 1, causes an unbalance of the bridge and modulation of the output of oscillator 71. The modulated carrier signal is coupled from bridge 72 by line 80 to preamplifier 73. The amplified signal is coupled through transformer 81 and line 82 to detector 74 for demodulation. The bridge-detector circuit 6 does not per se constitute part of the invention.

In operation, actuator rod 30 and bellows 20 and 21 are reciprocated vertically by rotation of eccentric cam 48. The pressure in tank 23 increases and decreases on successive strokes of the rod. The number of tank pressure reversals per unit time depends on the rate of reciprocation of the bellows which is controlled by speed change mechanism 50, potentiometer 56, and pulleys 52 and 53. Tank pressure is given by the expression $$p = \frac{rA\gamma P_o}{2V_o}\left\{1 + \frac{(\gamma-1)A_w}{\alpha V_o} + 1/2\left[\frac{(\alpha-1)A_w}{V_o}\right]^2\right\}^{-1/2}$$

where $p$ = peak pressure, in dynes per square centimeter,
$V_o$ = volume of the reservoir, in cubic centimeters,
$A$ = differential cross-sectional area of the bellows, in square centimeters,
$r$ = stroke of the bellows in centimeters,
$P_o$ = atmospheric pressure, in dynes per square centimeter,
$\gamma$ = ratio of specific heat (1.4 for air)

$$\alpha = \sqrt{\frac{\omega\rho C_p}{2K}} = 3.8\sqrt{f}$$

for air, at 20° C., $A_w$ = area of the metallic walls exposed to the inside of the chamber, in square centimeters,
$K$ = thermal conductivity of enclosed gas ($6.2 \times 10^{-6}$ for air),
$\rho$ = density of the gas, in grams per cubic centimeter,
$C_p$ = specific heat of the gas at constant pressure (0.25 for air),
$\omega = 2\pi f$, and
$f$ = frequency of reciprocation of rod 30 in c.p.s.

The bracketed term may be regarded as a correction factor for the departure from a purely adiabatic compression which is caused by the thermal conductivity of the tank walls. It is seen that the tank pressure is proportional to the product of the difference in cross sectional areas of bellows 20 and 21 (the term A) and the axial displacement of actuator rod 30 (the stroke r) which is indicated by displacement indicator 49.

The output of oscillator 71 and bridge 72 is a sinusoidal carrier signal of a suitable frequency such as 825 c.p.s. when the tank pressure is constant. Alterations in the tank pressure, which are coupled through tubing 4 to the microphone 2 being calibrated, cause the flexible capacitor plate in the microphone to vibrate and change the microphone capacitance. This capacitance variation causes unbalance of bridge 72 and modulation of the carrier signal from oscillator 71. The modulated carrier signal is coupled from bridge 72 through line 80 to preamplifier 73. The amplified signal is demodulated by detector 74 to provide an electrical signal that is directly proportional to the response of the microphone 2 to an incident pressure signal. The output of detector 74, and thus bridge-detector 6 of FIGURE 1, is processed by filter 7 and amplifier 8. The amplified signal is coupled through line 9 to a recorder 3 which makes a permanent record of the response of the microphone 2 as shown by trace 10 in FIGURE 5.

The carrier signal of suitable frequency, such at 400 c.p.s., is coupled from oscillator 63 on tank 23 to the primary winding 60 of electromechanical transducer 25. Axial displacement of core 62, caused by reciprocation of acuator rod 30, is directly proportional to the pressure alternations in tank 23. Movement of the core adjacent to primary and secondary windings 60 and 61 of transducer 25 causes variation of the inductive coupling at the same rate and results in modulation of the carrier signal. This modulated signal is coupled through lines 14 to detector 15 for demodulation. The demodulated signal is filtered and amplified and coupled through line 17 (FIGURE 1) to recorder 3 and appears as trace 18 in FIGURE 5. Trace 18 is a reference signal for determining the phase shift characteristics of the microphone 2 being calibrated.

Figure 6:
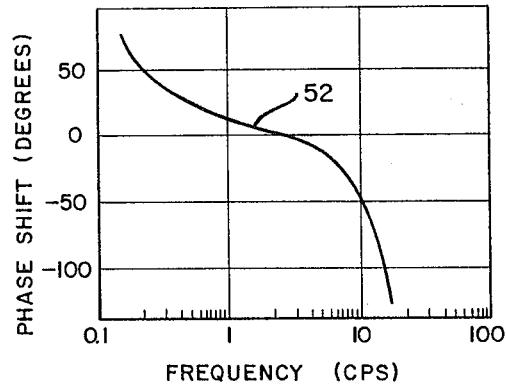
FIGURE 6 is a plot showing a typical frequency response of a microphone.
Figure 7:
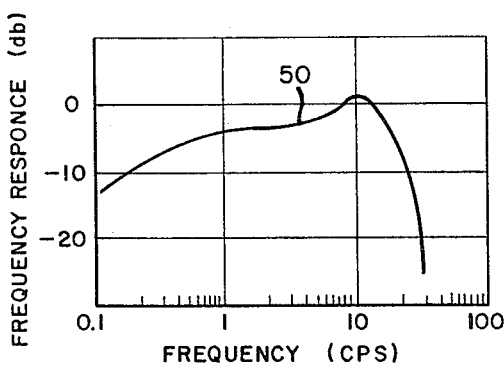
FIGURE 7 is a plot showing the phase shift characteristics of a microphone.

In order to determine the frequency response and phase shift characteristics of a particular microphone, the bellows are reciprocated at successively increasing frequencies and the change in amplitude and phase of trace 10 is measured and plotted. The result is a frequency response curve 50 as shown in FIGURE 7 and a phase shift curve 52 as shown in FIGURE 6. The loss in the microphone as a function of frequency is determined by measuring the amplitude of the signal which produces trace 10. Phase shift may be determined electronically by phase comparison of the two signal outputs from amplifier 8 or may be measured from the oscillograms by noting the relative displacement (phase shift) $d$ between corresponding parts of traces 10 and 18.

With the above described apparatus, accurate calibration of microphones at very low frequencies is provided. The calibrator 1 generates measurable low amplitude pressure waves at these frequencies without necessitating an excessively large tank. For example, pressure waves having an amplitude of one dyne per square centimeter at a frequency of 0.1 c.p.s. have been generated with a 2000 cubic inch tank 23. This is due, at least in part, to the controllable incremental differences in volumes of the bellows 20 and 21. Another feature of the apparatus is the minimum maintenance required and the long life due to minimum wear of moving parts.

What is claimed is:

1. A microphone calibration system comprising
a pressure wave generator comprising
  a tank,
  a tank extension,
  a pair of cylindrical bellows connected to opposite sides of said extension in axial alignment with each other,
    said bellows having different diameters,
  a rod extending through said bellows and said extension,
  means for connecting to said rod the end of each bellows remote from the extension whereby said remote ends of the bellows move with the rod relative to the extension, and
drive means for axially reciprocating said rod at a predetermined rate whereby to produce pressure alternations in said tank,
means for selectively changing the rate of reciprocation of said rod,
a test microphone connected to said tank and responsive to the pressure therein for producing a first electrical effect,
a transducer connected to said rod and responsive to the motion thereof for producing a second electrical effect,
means for comparing said first and second electrical effects to determine phase difference, and
means for comparing first electrical effects at different rates of reciprocation of the rod to determine response.

2. A microphone calibration system comprising
a pressure wave generator comprising
  tank means,
    a pair of cylindrical bellows each connected at one end to said tank means and communicating with the interior thereof,
      said bellows having different diameters,
    bellows actuating means connected to the other end of each bellows and operative to increase the volume of one bellows and simultaneously decrease the volume of the other bellows,
drive means for reciprocably moving said actuating means at a predetermined rate whereby to produce pressure alternations in said tank,
means for selectively changing the rate of movement of said actuating means,
a test microphone connected to said tank means and responsive to the pressure therein for producting a first electrical effect,
a transducer responsive to motion of said actuating means for producing a second electrical effect,
means for comparing said first and second electrical effects to determine phase difference, and
means for comparing first electrical effects at different rates of movement of the actuating means to determine response.

3. A microphone calibration system comprising
a pressure wave generator comprising
  tank means,
    a pair of volume varying elements connected to said tank means and movable relative thereto for changing the volume of the tank means,
      said elements having different dimensions whereby to change the pressure in said tank means upon equal simultaneous movement of both elements,
drive means for moving said elements oppositely and simultaneously at a predetermined rate whereby to produce pressure alternations in said tank means,
means for selectively changing the rate of movement of said drive means,
a test microphone connected to said tank means and responsive to the pressure therein for producing a first electrical effect,
a transducer responsive to the motion of said drive means for producing a second electrical effect,
means for comparing said first and second electrical effects to determine phase difference, and
means for comparing first electrical effects at different rates of movement of the drive means to determine response.

4. A calibrator comprising,
an airtight enclosure,
a pair of axially aligned bellows attached to and communicating with the interior of said reservoir, said bellows having different cross sectional areas,
a rod extending through said bellows and enclosure and being rigidly secured to said bellows,
means for axially displacing said rod and bellows for producing changes in the pressure in said enclosure, and
an electromechanical transducer for converting said axial motion of the rod to an electrical signal directly proportional to said pressure variations in the enclosure.

5. The calibrator of claim 4 wherein said electromechanical transducer is a differential transformer having a movable core, said core being connected to said rod.

No references cited.

KATHLEEN H. CLAFFY, *Primary Examiner.*

F. N. CARTEN, *Assistant Examiner.*